(12) United States Patent
Hongo et al.

(10) Patent No.: US 11,016,698 B2
(45) Date of Patent: May 25, 2021

(54) STORAGE SYSTEM THAT COPIES WRITE DATA TO ANOTHER STORAGE SYSTEM

(71) Applicant: Hitachi, Ltd., Tokyo (JP)

(72) Inventors: Kazuki Hongo, Tokyo (JP); Yasuhiko Yamaguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 63 days.

(21) Appl. No.: 16/484,607

(22) PCT Filed: Jul. 4, 2017

(86) PCT No.: PCT/JP2017/024418
§ 371 (c)(1),
(2) Date: Aug. 8, 2019

(87) PCT Pub. No.: WO2019/008654
PCT Pub. Date: Jan. 10, 2019

(65) Prior Publication Data
US 2020/0004425 A1    Jan. 2, 2020

(51) Int. Cl.
*G06F 3/06* (2006.01)
*G06F 12/0868* (2016.01)

(52) U.S. Cl.
CPC .............. *G06F 3/065* (2013.01); *G06F 3/061* (2013.01); *G06F 3/067* (2013.01); *G06F 3/0656* (2013.01);
(Continued)

(58) Field of Classification Search
CPC ......... G06F 3/065; G06F 3/061; G06F 3/0656
See application file for complete search history.

(56) References Cited

U.S. PATENT DOCUMENTS

2004/0103254 A1   5/2004   Satoyama et al.
2008/0104347 A1   5/2008   Iwamura et al.
(Continued)

FOREIGN PATENT DOCUMENTS

JP   2004-145855 A   5/2004
JP   2008-134987 A   6/2008
(Continued)

OTHER PUBLICATIONS

International Search Report of PCT/JP2017/024418 dated Oct. 3, 2017.

*Primary Examiner* — David E Martinez
(74) *Attorney, Agent, or Firm* — Mattingly & Malur, PC

(57) ABSTRACT

A storage system is coupled to another storage system and a higher-level apparatus via a network, and copies write data received from the higher-level apparatus to the other storage system. This storage system is provided with interface units, each provided with a plurality of ports that can be coupled to the network; and a plurality of controllers coupled to a respective one of the interface units. Each controller has a processor unit. When each processor unit receives write data from the higher-level apparatus via a first port coupled to the interface unit that is coupled to the controller to which the processor unit belongs, the processor unit selects, from among the ports of the interface unit coupled to the controller to which the processor unit belongs, a second port for transmitting the write data to the other storage system, and transmits the write data to the other storage system.

12 Claims, 17 Drawing Sheets

(52) U.S. Cl.
CPC .... *G06F 12/0868* (2013.01); *G06F 2212/313* (2013.01)

(56) References Cited

U.S. PATENT DOCUMENTS

| | | |
|---|---|---|
| 2008/0189450 A1 | 8/2008 | Kokubo et al. |
| 2009/0198896 A1* | 8/2009 | Maki .................. G06F 11/2069 711/119 |
| 2011/0161520 A1* | 6/2011 | Horiuchi ............. H04L 67/1095 709/244 |
| 2015/0242146 A1 | 8/2015 | Shinozaki et al. |
| 2017/0017403 A1 | 1/2017 | Sekine et al. |

FOREIGN PATENT DOCUMENTS

| | | |
|---|---|---|
| JP | 2008-191782 A | 8/2008 |
| JP | 2015-162091 A | 9/2015 |
| WO | 2015/198390 A1 | 12/2015 |

\* cited by examiner

FIG. 3

| # | GAD_VOL# | User specification | Path selection mode | Performance specialized change threshold |
|---|---|---|---|---|
| 1 | 1 | Performance specialized | Performance specialized | - |
| 2 | 2 | RoundRobin | RoundRobin | - |
| 3 | 3 | Not specified | Performance specialized | Equal to or larger than 0.9 and equal to or smaller than 1.1 |
| 4 | 4 | Not specified | RoundRobin | Equal to or larger than 0.8 and equal to or smaller than 1.2 |
| : | : | : | : | : |

STORAGE SYSTEM THAT COPIES WRITE DATA TO ANOTHER STORAGE SYSTEM

TECHNICAL FIELD

The present invention relates to a storage system or the like that copies write data from a higher-level apparatus to another storage system.

BACKGROUND ART

For example, a technology in which a primary storage system and a secondary storage system are coupled via a network so that the same data is retained in the primary storage system and the secondary storage system, and the secondary storage system is used when a fault occurs in the primary storage system is known. In this technology, in order to ensure that the same data is retained in the primary storage system and the secondary storage system, a function (TC: True Copy) of copying data written to the primary storage system to the secondary storage system is used.

Moreover, a technology disclosed in PTL 1 is known as a technology for improving availability of an information system including a storage system that performs remote copy between two or more storage apparatuses and a host that uses the storage system.

Furthermore, for example, an apparatus (GAD: Global-active device) which uses a technology of virtualizing a plurality of storage systems as one storage system for a server so that the same data is retained in the plurality of storage systems is known.

CITATION LIST

Patent Literature

[PTL 1] Japanese Patent Application Publication No. 2008-134987

SUMMARY OF INVENTION

Technical Problem

For example, in order to ensure that the same data is retained among a plurality of storage systems, when write data is written to one storage system, it is necessary to copy the write data to the other storage system. Therefore, when one storage system receives write data from a higher-level apparatus (for example, a host apparatus), the storage system needs to transmit the write data to the other storage system.

In such a case, it is necessary to move the write data received and stored in a predetermined storage area (for example, a transfer buffer) to a predetermined storage area (for example, another transfer buffer) for transmission.

In a conventional storage system, an ASIC (Application Specific Integrated Circuit) capable of realizing DMA (Direct Memory Access) transfer is mounted and write data is transmitted from a transfer buffer to another storage area with the aid of the ASIC.

In recent years, in order to reduce a hardware cost of a storage system, a processor simulates a DMA transfer function of ASIC without mounting ASIC.

Since a processor simulates the DMA transfer function, the load of a processor may increase depending on a situation and the IO (input/output) performance of a storage system may decrease.

The present invention has been made in view of the problems, and an object thereof is to provide a technique capable of reducing a load on a processor and suppressing a decrease in IO performance.

Solution to Problem

In order to attain the object, a storage system according to an aspect is coupled to another storage system and a higher-level apparatus via a network to copy write data from the higher-level apparatus to the other storage system. The storage system includes: a plurality of interface units each having a plurality of ports couplable to the network; and a plurality of controllers each being coupled so as to correspond to each of the interface units. The controller includes a processor unit. When the processor unit receives write data from the higher-level apparatus via a first port of the interface unit coupled to a controller to which the processor unit belongs, the processor unit selects a second port for transmitting the write data to the other storage system among the ports of the interface unit coupled to the controller to which the processor unit belongs, and transmits the write data to the other storage system via the second port.

Advantageous Effects of Invention

According to the present invention, since it is possible to suppress transmission of write data between different controllers, it is possible to reduce a load on a processor and suppress a decrease in IO performance.

BRIEF DESCRIPTION OF DRAWINGS

FIG. 3 is a diagram illustrating a configuration of a path selection management table according to the first embodiment.

DESCRIPTION OF EMBODIMENTS

Next, some embodiments will be described with reference to the drawings. The embodiments described below are not intended to limit the inventions according to the claims, and all elements and combinations thereof described in the embodiments are not necessarily essential to the solving means for the invention.

In the following description, a "processor unit" includes one or more processors. At least one processor is typically a microprocessor such as a CPU (Central Processing Unit). One or more processors may be single cores and may be multi-cores. The processor may include a hardware circuit that performs a part or all of the processings. Moreover, a process executed by a processor unit may be referred to as a process executed by a controller included in a processor.

Moreover, in the following description, although information is sometimes described using an expression of an "aaa table," the information may be expressed by an arbitrary data structure. That is, the "aaa table" may be referred to as "aaa information" in order to show that information does not depend on a data structure. Moreover, in the following description, the configuration of each table is an example, one table may be divided into two or more tables, and all or a portion of two or more tables may be integrated into one table.

A first embodiment will be described below.

First, an overview of the first embodiment will be described.

Figure 1:
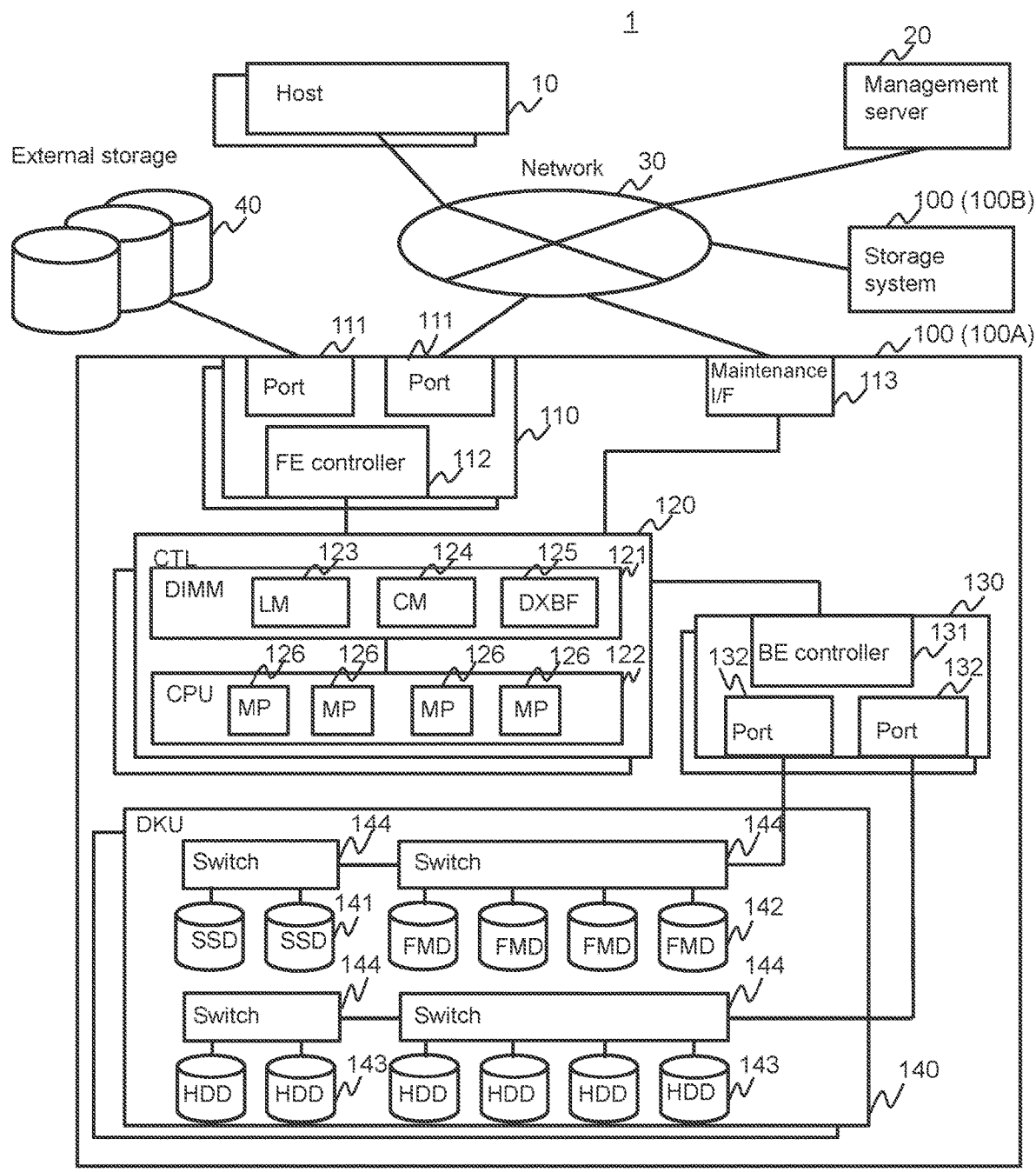
FIG. 1 is a diagram illustrating an overall configuration of a computer system according to a first embodiment.

As illustrated in FIG. 1, a computer system. 1 according to the first embodiment includes two storage systems 100 (100A, 100B). In the computer system 1, two storage systems 100 are configured and controlled so as to be able to retain the same data. For example, the two storage systems 100A and 100B can be controlled so as to retain the same data for a predetermined volume configured in advance.

When a write request for writing write data to a predetermined volume is issued from a host computer (hereinafter, also be referred to as a "host") 10 to one storage system 100A, the storage system 100A receives write data via a network 30.

In the storage system 100A, upon receiving the write data via a port 111, a microprocessor (MP) 126 of a CPU module 122 of a controller (CTL) 120 coupled to a front-end package (FEPK) 110 including the port 111 stores the write data in a transfer buffer 125 for the port 111 which received the write data.

The MP 126 stores the write data stored in the transfer buffer 125 in a cache memory (CM) 124 of the CTL 120 to which the MP 126 belongs, and a CM 124 of the other CTL 120.

Moreover, the MP 126 selects a port (a transmission port) to be used when transmitting write data to the storage system 100B among the ports 111 of the FEPK 110 coupled to the CTL 120 to which the MP 126 belongs. Subsequently, the MP 126 secures a transfer buffer 125 for the transmission port and stores the write data stored in the transfer buffer 125 for the port 111 which received the write data in the selected transfer buffer 125 secured for the transmission port. Subsequently, the MP 126 performs control so that the write data stored in the transfer buffer 125 is transmitted to the transmission destination storage system 100B with the aid of the selected transmission port.

As described above, according to the storage system 100 according to the present embodiment, the MP 126 selects a port to be used when transmitting write data to the storage system 100B among the ports 111 of the FEPK 110 coupled to the CTL 120 to which the MP 126 belongs. Therefore, since the MP 126 does not need to perform a write data transmission processing between different CTLs 120, it is possible to reduce the load on the MP 126 and to suppress a decrease in overall IO performance of the storage system 100.

Next, the first embodiment will be described in detail.

FIG. 1 is a diagram illustrating an overall configuration of a computer system according to the first embodiment.

The computer system 1 includes a host computer (hereinafter referred to as a host) 10 as an example of a higher-level apparatus, a management server 20, a plurality of storage systems 100 (100A, 100B), and an external storage 40. The host 10, the management server 20, and the storage systems 100A and 100B are coupled via a network 30. The network 30 may be a LAN (Local Area Network) or a WAN (Wide Area Network), for example. A network that couples the host 10 and the storage systems 100A and 100B, a network that couples the management server 20 and the storage systems 100A and 100B, and a network that couples the storage systems 100A and 100B may be different networks.

In the present embodiment, the storage systems 100A and 100B are virtualized so as to be used as the same storage system in the host 10. That is, the storage systems 100A and 100B are configured as a GAD (Global-active device), for example.

The host 10 is a computer that executes applications, for example, and is configured to read data to be used in applications from the storage system 100 and write data created by applications to the storage system 100. In the present embodiment, the host 10 is configured to perform data input and output to the storage systems 100A and 100B as one virtual storage system, and is configured to perform data input and output to a storage system 100 in which a fault has not occurred, when a fault occurs in any one of the storage systems 100A and 100B.

The management server 20 is a computer used by an administrator in order to execute a management processing of managing the computer system 1. The management server 20 executes various management processings according to an operation of an administrator on an input device.

The external storage device 40 includes one or more storage devices. The storage device is a device having a nonvolatile storage medium and is an HDD (Hard Disk Drive), an SSD (Solid State Drive), and an FMD (Flash Module Drive), for example.

The storage system 100 includes a plurality of front-end packages (FEPKs) 110, a maintenance interface (a maintenance I/F) 113, a plurality of controllers (CTLs) 120, a plurality of back-end packages (BEPKs) 130, and one or more disk units (DKUs) 140.

The FEPK 110 is an example of an interface unit and includes a plurality of ports 111 and a FE controller 112 that performs internal control of the FEPK 110. The port 111 couples the storage system 100 to various apparatuses via the network 30. The port 111 includes a port that receives data via the network 30 (Target port: also referred to as a TarPort) and a port that transmits commands for a write request and the like via a network (Initiator port: also referred to as an IniPort). The type of the port 111 may be configured in advance and may be changed depending on a situation. The FE controller 112 performs protocol conversion between a communication protocol of the network 30 side and a protocol of the CTL 120 side.

The maintenance I/F 113 is an interface for coupling the storage system 100 to the management server 20.

The CTL 120 includes a memory module (DIMM) unit 121 and a CPU module unit 122. The DIMM unit 121 is constituted by a RAM (Random Access Memory) or the like, for example. The DIMM unit 121 includes a local memory (LM) 123, a cache memory (CM) 124, and a transfer buffer 125. The LM 123 mainly stores programs and data necessary for processing or the like. The CM 124 temporarily stores data (write data) written from the host 10 to the DKU 140 and data (read data) read from the DKU 140, mainly. The transfer buffer 125 temporarily stores data received via the port 111 of the FEPK 110 and data to be transmitted to other apparatuses via the port 111, mainly. The CPU module unit 122 includes one or more microprocessors (MPs) 126. The MP 126 executes various processings (for example, JOBs) by executing programs stored in the LM 123.

The BEPK 130 is an example of a disk interface and includes a plurality of ports 132 and a BE controller 131 that performs internal control of the BEPK 130. The port 132 communicably couples the CTL 120 and the DKU 140. The port 132 is a port (for example, an SAS (Serial Attached SCSI) port) compatible with the protocol of the DKU 140 side, for example. The BE controller 131 controls processing related to transfer (read and write) of data via the port 132. The BE controller 131 performs protocol conversion between a protocol (for example, SAS) used in the DKU 140 side and communication protocol (for example, PCI-Express) used in the CTL 120 side, for example.

The DKU 140 includes a plurality of storage devices (for example, SSD 141, FMD 142, and HDD 143) and a switch 144. A storage area of the storage device of the DKU 140 is allocated to the host 10 as a volume. In the present embodiment, a volume managed so as to retain the same data as other storage systems is referred to as a GAD volume (GAD_VOL).

Next, a configuration of a portion of the storage system 100 will be described in more detail.

Figure 2:
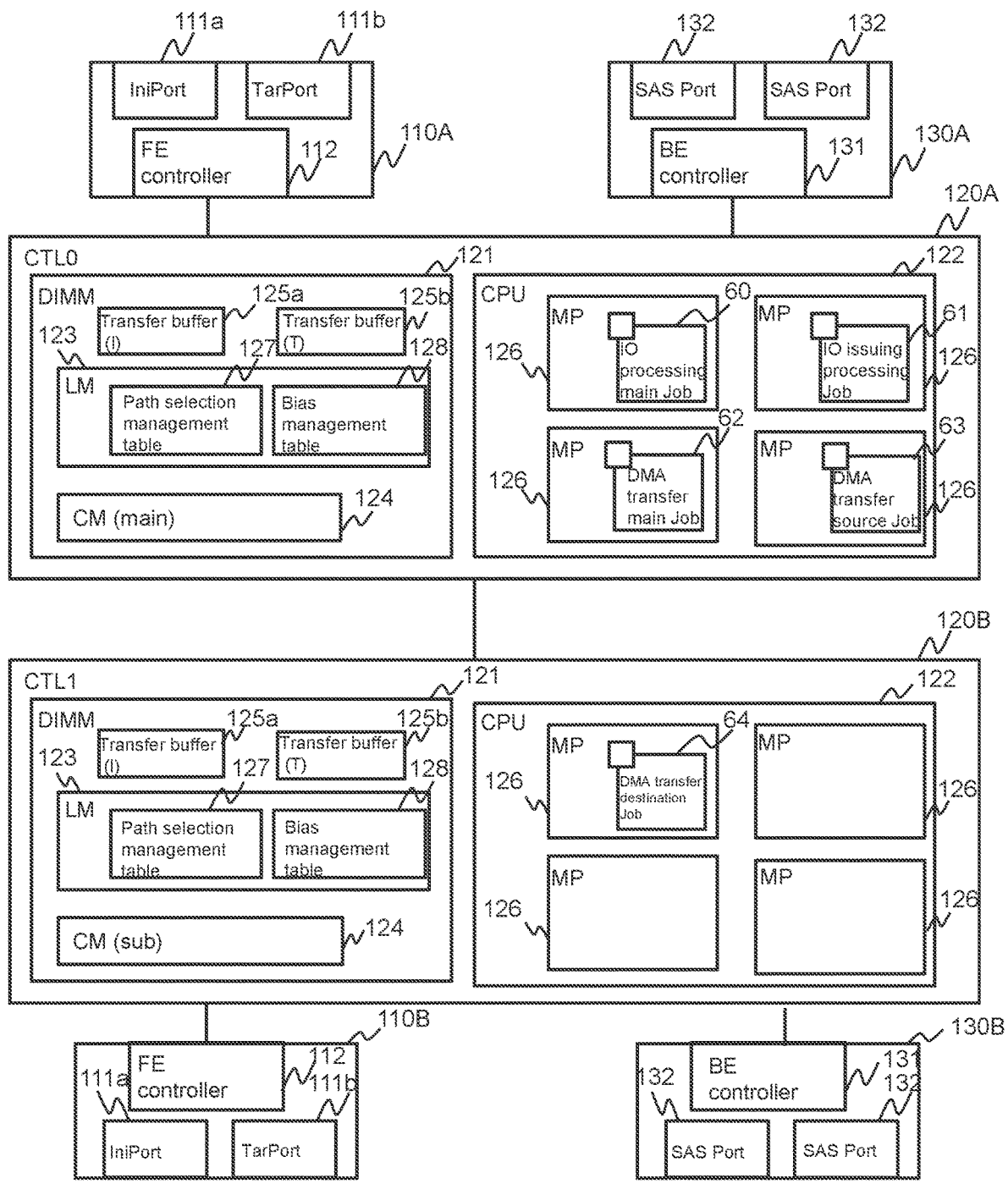
FIG. 2 is a diagram illustrating a partial configuration of a storage system according to the first embodiment.

FIG. 2 is a diagram illustrating a partial configuration of the storage system according to the first embodiment.

The storage system. 100 according to the present embodiment includes two FEPKs 110 (110A, 110B), two CTLs 120 (120A, 120B) and two BEPKs 130 (130A, 130B), and one FEPK 110 and one BEPK 130 are coupled to one CTL 120.

More specifically, the FEPK 110A and the BEPK 130A are coupled directly to the CTL 120A (also referred to as CTL0), and the FEPK 110B and the BEPK 130B are coupled directly to the CTL 120B (also referred to as CTL1). The CTL 120A and the CTL 120B are communicably coupled to each other.

In the LM 123 of the DIMM unit 121 of the CTL 120 (120A, 120B), a path selection management table 127 for managing selection of a path (for example, a port 111 to be used) for copying write data to GAD_VOL to other storage systems 100 and a bias management table 128 for managing bias in the number of Write command (the number of write requests) received between respective CTLs are stored.

Next, the path selection management table 127 will be described.

FIG. 3 is a diagram illustrating a configuration of a path selection management table according to the first embodiment.

The path selection management table 127 stores records for each GAD_VOL managed by the DKU 140. The record of the path selection management table 127 includes columns including # 127a, GAD_VOL#127b, user specification 127c, path selection mode 127d, and performance specialized change threshold 127e.

A record number is stored in # 127a. A number (GAD_VOL#) capable of identifying GAD_VOL is stored in GAD_VOL# 127b. Information specified by a user (user specification) for a path selection mode during copying of write data to GAD_VOL corresponding to a record is stored in user specification 127c. For example, "performance specialized" is stored in the user specification 127c when there is a user specification such that a performance specialized mode is to be performed so that a port to be used when copying write data is to be selected among the ports of the same FEPK 110 as the port used for receiving the write data, "RoundRobin" is stored in the user specification 127c when there is a user specification such that a round robin mode is to be performed so that the port is to be selected among the ports of the storage system 120 according to the round robin method, and "not specified" is stored in the user specification 127c when there is no specification.

The name of a mode determined to be executed when selecting a path when copying write data to GAD_VOL corresponding to a record is stored in the path selection mode 127d. For example, "performance specialized" is stored in the path selection mode 127d when it is determined that a performance specialized mode is to be executed, and "RoundRobin" is stored in the path selection mode 127d when it is determined that a round robin mode is to be executed. A threshold (a performance specialized change threshold) indicating the range of degrees of bias in Write commands received between CTLs serving as determination criteria when selecting the performance specialized mode is stored in the performance specialized change threshold 127e.

Next, the bias management table 128 will be described.

Figure 4:
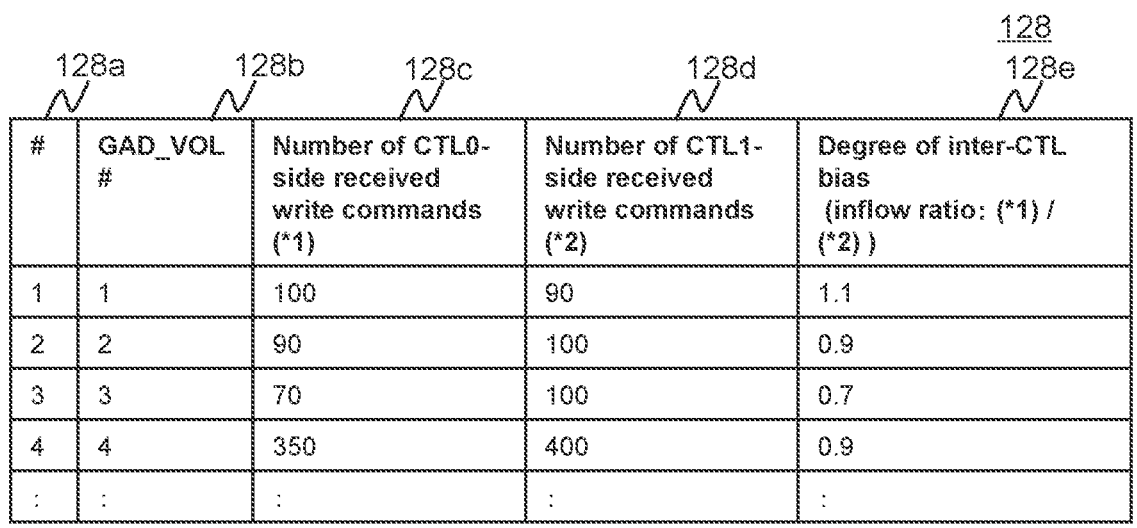
FIG. 4 is a diagram illustrating a configuration of a bias management table according to the first embodiment.

FIG. 4 is a diagram illustrating a configuration of the bias management table according to the first embodiment.

The bias management table 128 stores records for each GAD_VOL managed by the DKU 140. The record of the bias management table 128 includes columns of # 128a, GAD_VOL# 128b, number of CTL0-side received Write commands 128c, number of CTL1-side received Write commands 128d, and degree of inter-CTL bias 128e.

A record number is stored in # 128a. A number (GAD_VOL#) capable of identifying GAD_VOL is stored in GAD_VOL# 128b. The number (number of write requests) of Write commands received by CTL0 with respect to GAD_VOL corresponding to a record is stored in the number of CTL0-side Write commands 128c. The number in the number of CTL0-side Write commands 128c is updated by the MP 126 when the CTL0 receives a Write command, for example. The number (number of write requests) of Write commands received by CTL0 with respect to GAD_VOL corresponding to a record is stored in the number of CTL1-side Write commands 128d. The number in the number of CTL1-side Write commands 128d is, for example, updated by the MP 126 when the CTL1 receives a Write command.

The degree of bias between CTLs, of a Write command with respect to GAD_VOL corresponding to a record is stored in the degree of inter-CTL bias 128e. In the present embodiment, for the degree of bias of between Write commands in relation to GAD_VOL, an inter-CTL inflow ratio, that is, the ratio of the number (*1) in number of CTL0-side Write commands 128c to the number in number (*2) of CTL1-side Write commands 1218d, is used, for example. The degree of bias in the degree of inter-CTL bias 128e may be calculated and determined at any time point and may be calculated when the number in the number of CTL0-side Write commands 128c or the number in the number of CTL1-side Write commands 128d is updated.

Next, an operation of a write processing when a write request is received in the storage system 100 according to the first embodiment will be described.

Figure 5:
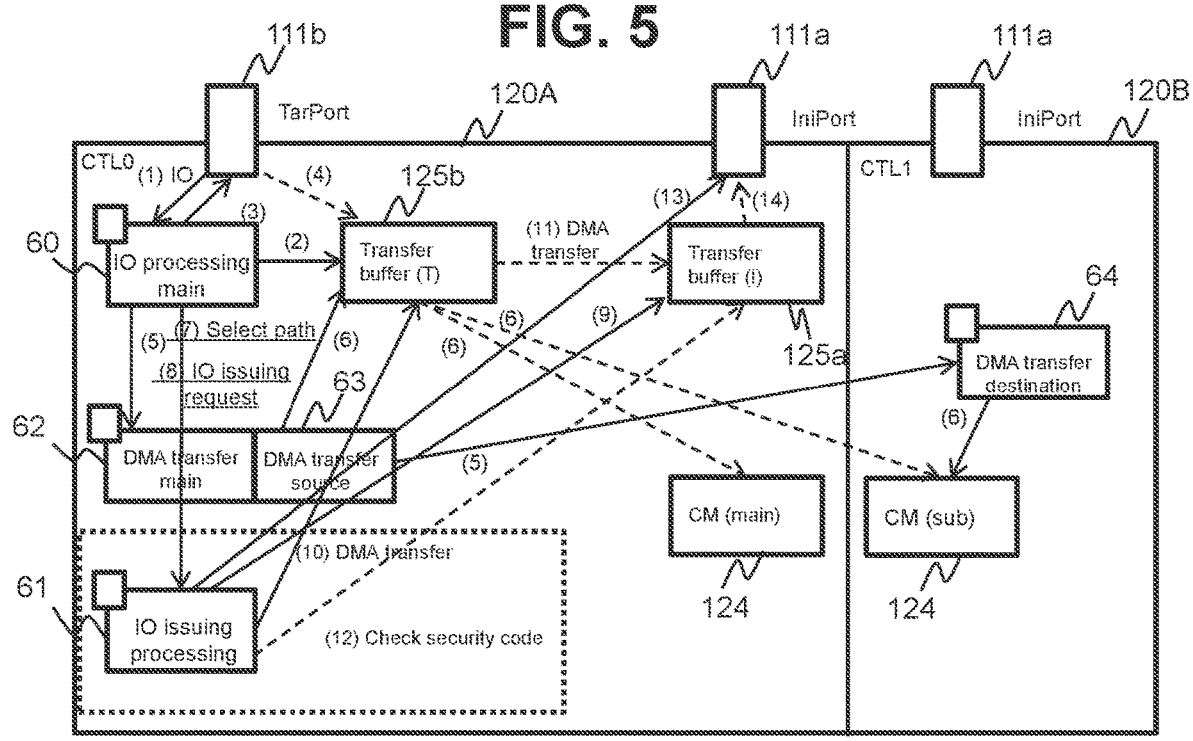
FIG. 5 is a diagram for describing an operation of a write processing when a write request is received according to the first embodiment.
Figure 6:
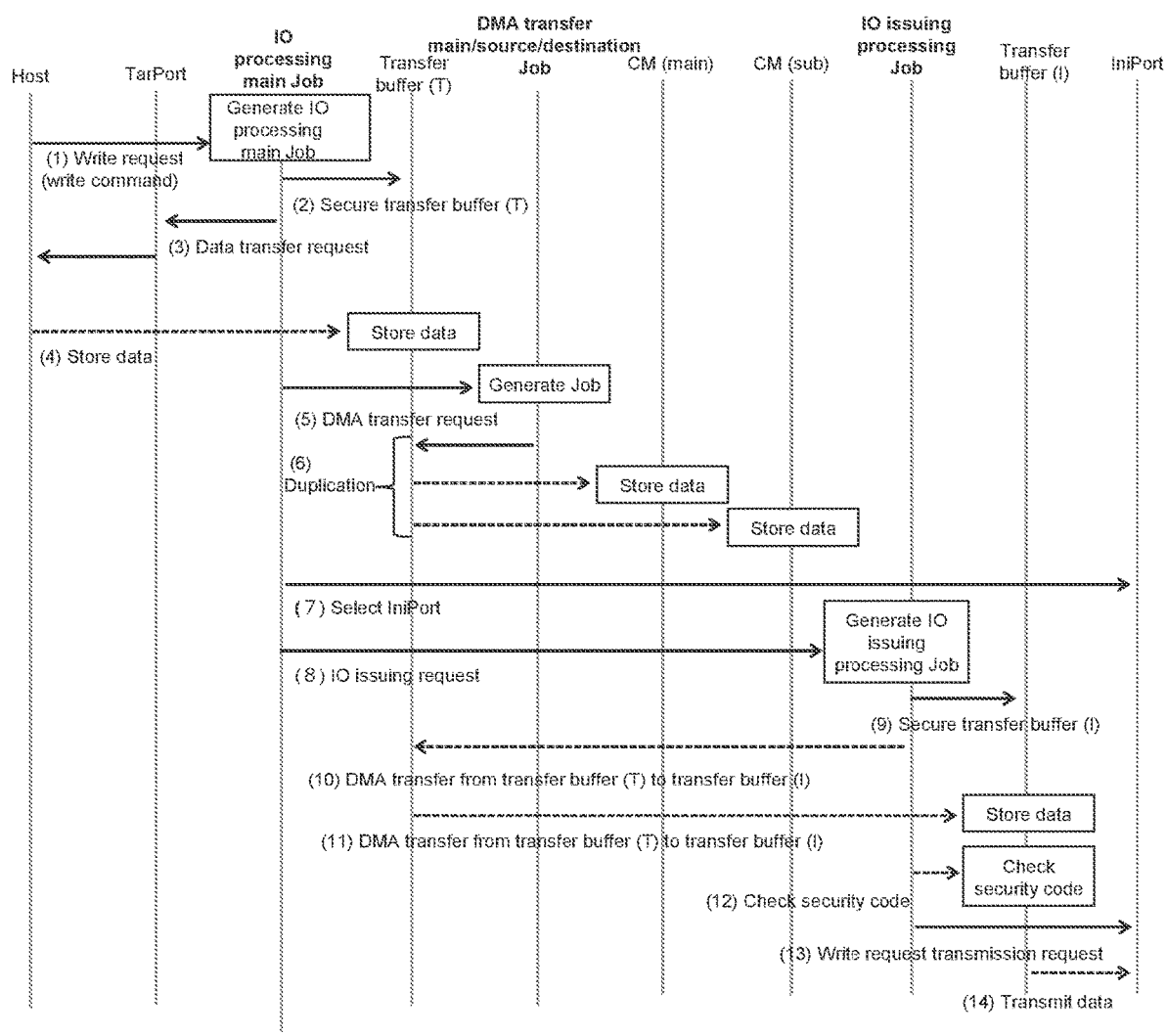
FIG. 6 is a sequence diagram of a write processing when a write request is received according to the first embodiment.

FIG. 5 is a diagram for describing an operation of a write processing when a write request is received according to the first embodiment. FIG. 6 is a sequence diagram of a write processing when a write request is received according to the first embodiment. FIGS. 5 and 6 illustrate processings when the path selection mode 127d of the path selection management table 127 corresponding to GAD_VOL which is the target of a write request is configured to a performance specialized mode.

First, upon receiving a write request (a Write command) from the host 10 via the TarPort 111b (a first port) ((1) in FIGS. 5 and 6), the MP 126 of the CTL 120 generates a main Job (an IO processing main Job) 60 and starts executing the IO processing main Job 60.

The MP 126 executing the IO processing main Job 60 secures the transfer buffer 125b for storing write data corresponding to the write request in the DIMM unit 121 ((2) in FIGS. 5 and 6) and transmits a data transfer request to the host 10 via the TarPort 111b ((3) in FIGS. 5 and 6).

As a result, the write data transmitted from the host 10 is stored in the transfer buffer 125b via the TarPort 111b ((4) in FIGS. 5 and 6).

Subsequently, the MP 126 executing the IO processing main Job 60 issues a DMA transfer request to generate a DMA transfer job (a DMA transfer main Job 62, a DMA transfer source Job 63, and DMA transfer destination Job 64) for simulating DMA transfer ((5) in FIGS. 5 to 6). Here, the DMA transfer main Job 62 generates the DMA transfer source Job 63 in the same CTL (in this example, CTL0) and generates the DMA transfer destination Job 64 in another CTL (in this example, CTL1).

The MP 126 executing the DMA transfer source Job 63 reads the write data stored in the transfer buffer 125b and stores the write data in the CM 124 (CM (main)) of CTL0 and the CM 124 (CM (sub)) of CTL1 to perform duplication of the write data ((6) in FIGS. 5 and 6). The MP 126 of CTL1 executing the DMA transfer destination Job 64 examines whether write data is stored in the CM 124 (CM (sub)) of CTL1 on the basis of a security code, for example. The write data stored in the CM 124 is stored in a storage device of the DKU 140 by the MP 126 at a predetermined timing.

Moreover, the MP 126 executing the IO processing main Job 60 selects a port (IniPort) for transmitting write data to another storage system 100 ((7) in FIGS. 5 and 6). In this example, since the path selection mode 127d of the path selection management table 127 corresponding to GAD_VOL which is the target of a write request is configured to the performance specialized mode, the MP 126 selects the IniPort 111a (a second port) among the ports of the FMPK 110A to which the TarPort 111b having received the write request belongs. In the present embodiment, there is no time constraint for execution in the processing (5) and (6) in FIGS. 5 and 6 and the processing subsequent to (7) in FIGS. 5 and 6. That is, any one of the processing may be performed earlier than other processing and the processing may be performed in parallel.

Subsequently, the MP 126 executing the IO processing main Job 60 issues an IO issuing request to generate a copy job (an IO issuing processing Job 61) for transmitting write data to another storage system ((8) in FIGS. 5 and 6).

The MP 126 executing the IO issuing processing Job 61 secures the transfer buffer 125a for storing the write data to be transmitted by the selected IniPort 111a ((9) in FIGS. 5 and 6), reads the write data stored in the transfer buffer 125b, and stores the same in the transfer buffer 125a ((10) and (11) in FIGS. 5 and 6).

Subsequently, the MP 126 executing the IO issuing processing Job 61 examines whether write data is stored appropriately by checking a security code of the write data stored in the transfer buffer 125a ((12) in FIGS. 5 and 6).

Subsequently, the MP 126 executing the IO issuing processing Job 61 issues a transmission request for the write request to the IniPort 111a ((13) in FIGS. 5 and 6).

In this way, a write request for writing write data is transmitted to another storage system 100 that is to store a copy of the write data via the IniPort 111a. After that, when a data transfer request is received from the other storage system. 100, the write data stored in the transfer buffer 125a is transmitted to the other storage system 100 via the IniPort 111a and is stored in the storage system 100 ((14) in FIGS. 5 and 6).

As described above, according to the storage system 100 of the present embodiment, when the path selection mode is determined to be the performance specialized mode, since an IniPort for transmitting write data to the other storage system. 100 is selected from the same FEPK 110 as the TarPort having received the write request, it is not necessary to transmit write data to a transfer buffer of another CTL in order to transmit the write data and to reduce the load of the MP 126 of the CTL 120.

Next, a path configuration processing for configuring a path selection mode will be described.

Figure 7:
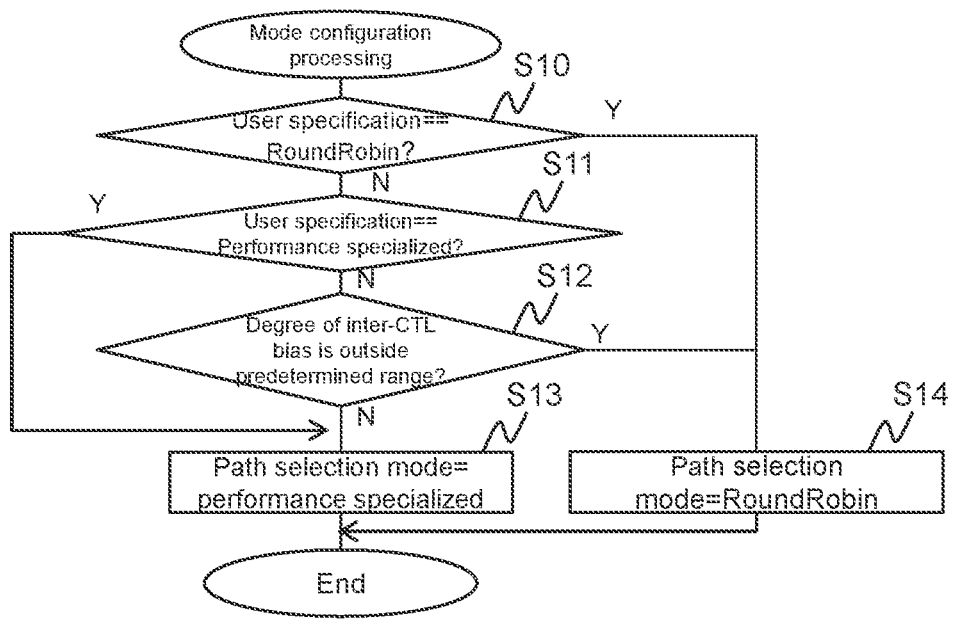
FIG. 7 is a flowchart of a mode configuration processing according to the first embodiment.

FIG. 7 is a flowchart of a mode configuration processing according to the first embodiment.

The mode configuration processing is executed by the MP 126 every predetermined period (for example, every 10 second), for example. The mode configuration processing is executed targeting each record of the path selection management table 127.

The MP 126 determines whether the value of the user specification 127c of a processing target record of the path selection management table 127 is "RoundRobin" (S10). When the value of the user specification 127c is "RoundRobin" (S10: Y), the value of the path selection mode 127d of the processing target record is configured to "RoundRobin" and the processing on the processing target record ends.

On the other hand, when the value of the user specification 127c is not "RoundRobin" (S10: N), the MP 126 determines whether the value of the user specification 127c of the processing target record is "performance specialized" (S11).

As a result, when the value of the user specification 127c is "performance specialized" (S11: Y), the MP 126 configures the value of the path selection mode 127d of the processing target record to "performance specialized" (S13) and the processing on the processing target record ends. On the other hand, when the value of the user specification 127c is not "performance specialized" (S11: N), that is, "not specified", the MP 126 determines whether the degree of inter-CTL bias acquired from the degree of inter-CTL bias 128e of the record corresponding to the same GAD_VOL of the bias management table 128 is outside a range (an allowable range) configured in the performance specialized change threshold 127e of the processing target record of the path selection management table 127 (S12).

As a result, when the degree of inter-CTL bias is outside the range configured in the performance specialized change threshold 127e of the processing target record (S12: Y), since it means that the Write command is biased to one CTL 120, the value of the path selection mode 127d of the processing target record is configured to "RoundRobin" (S14) in order to distribute the load between CTLs, and the processing on the processing target record ends. On the other hand, when the degree of inter-CTL bias is not outside the range configured in the performance specialized change threshold 127e of the processing target record (S12: N), since it means that the Write command is not too biased to one CTL 120, the value of the path selection mode 127d of the processing target record is configured to "performance specialized" (S13) in order to reduce the load between CTLs, and the processing on the processing target record ends.

Next, a write processing will be described.

Figure 8:
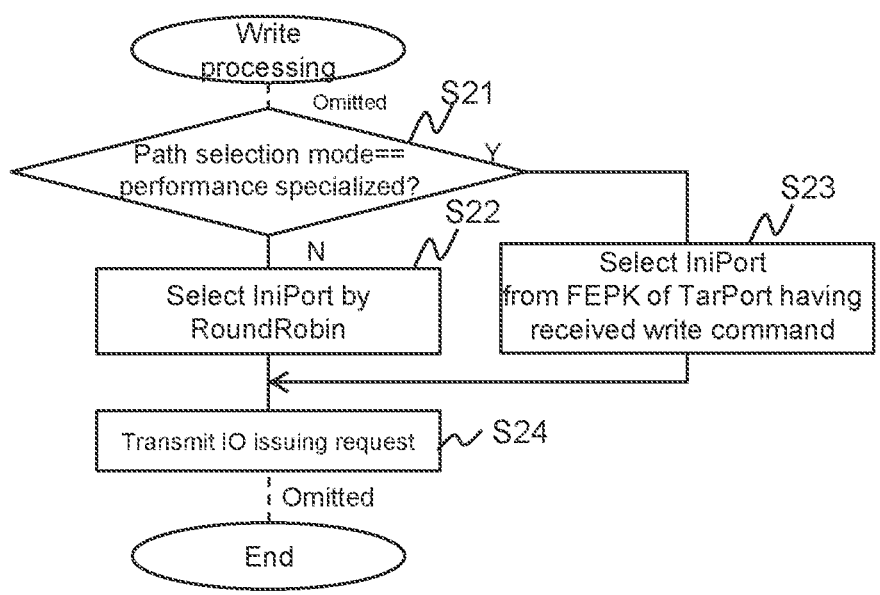
FIG. 8 is a flowchart of a portion of a write processing according to the first embodiment.

FIG. 8 is a flowchart of a portion of the write processing according to the first embodiment. The process illustrated in FIG. 8 is a processing of a portion that selects a port (an IniPort) for transmitting write data to another storage system 100 and is a processing executed by the MP 126 executing the IO processing main Job 60.

The MP 126 acquires a record of the path selection management table 127 corresponding to the GAD_VOL which is the target of a write request and determines whether the value of the path selection mode 127d of the record is "performance specialized" (S21). When the value of the path selection mode 127d is not "performance specialized" S21: N that is, "RoundRobin", the IniPort is selected among all ports 111 of the storage system 100 according to the round robin method (S22), and an IO issuing request for generating a copy job (the IO issuing processing Job 61) for transmitting write data to the other storage system is transmitted using the selected IniPort (S24). In this way, the write data is transmitted to the other storage system using the selected IniPort. In this case, when the selected IniPort is the port 111 of a PEPK 110 different from the TarPort, a processing of transmitting write data to a transfer buffer of the other CTL 120 is generated.

On the other hand, when the value of the path selection mode 127d of the record is "performance specialized" (S21: Y), the MP 126 selects the IniPort 111a among the ports 111 of the FEPK 110 of the TarPort 111b having received the Write command (S23) and transmits an IO issuing request for generating a copy job (the IO issuing processing Job 61) for transmitting the write data to the other storage system using the selected IniPort (S24). In this case, the processing illustrated in (9) to (14) in FIGS. 5 and 6 are performed subsequently.

Next, a storage system according to a modification of the first embodiment will be described.

The storage system according to this modification is similar to the storage system according to the first embodiment except that a user configuration applying processing (see FIG. 9) and a mode configuration processing (see FIG. 10) illustrated in below are executed instead of the mode configuration processing illustrated in FIG. 7.

First, the user configuration applying processing will be described.

Figure 9:
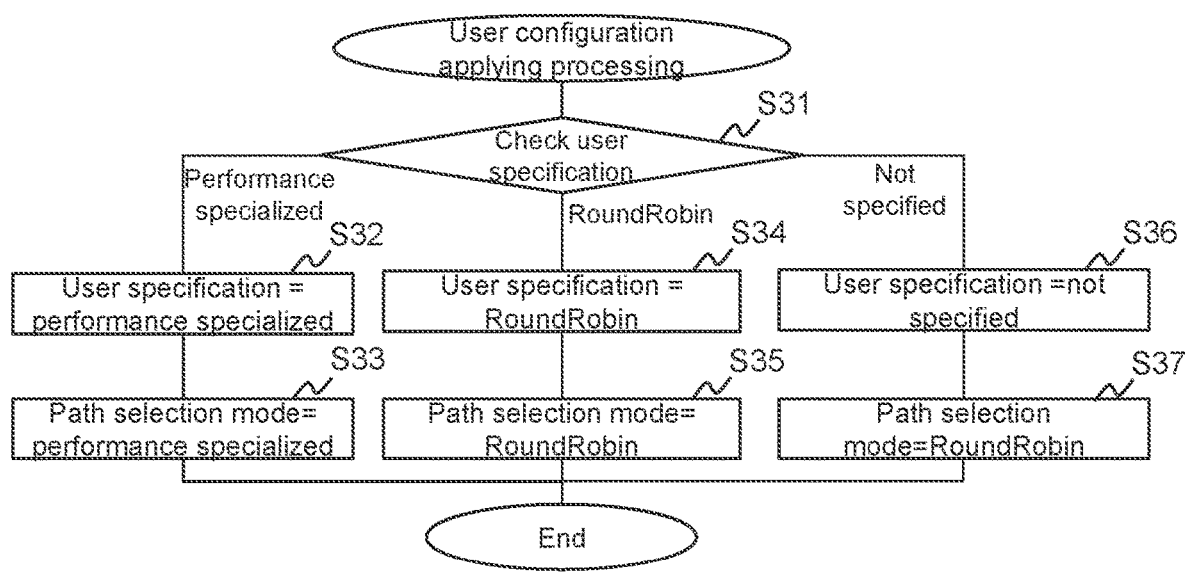
FIG. 9 is a flowchart of a user configuration applying processing according to a modification of the first embodiment.

FIG. 9 is a flowchart of a user configuration applying processing according to a modification of the first embodiment.

The user configuration applying processing is executed when a user's input for changing a user specification for a volume is received from the host 10, for example.

The MP 126 checks the value of the user specification for a volume input by a user (S31).

As a result, when the value of the user specification is "performance specialized" (S31: performance specialized), the MP 126 configures the value of the path selection mode 127d of the record of the path selection management table 127 corresponding to the specified volume to "performance specialized" (S32) and configures the value of the path selection mode 127d to "performance specialized" (S33), and ends the processing.

Moreover, when the value of the user specification is "RoundRobin" (S31: RoundRobin), the MP 126 configures the value of the path selection mode 127d of the record of the path selection management table 127 corresponding to the specified volume to "RoundRobin" (S34) and configures the value of the path selection mode 127d to "RoundRobin" (S35), and ends the processing.

Moreover, when the value of the user specification is "not specified" (S31: not specified), the MP 126 configures the value of the path selection mode 127d of the record of the path selection management table 127 corresponding to a specified volume to "not specified" (S36) and configures the value of the path selection mode 127d to "RoundRobin" (S37), and ends the processing.

Next, a mode configuration processing will be described.

Figure 10:
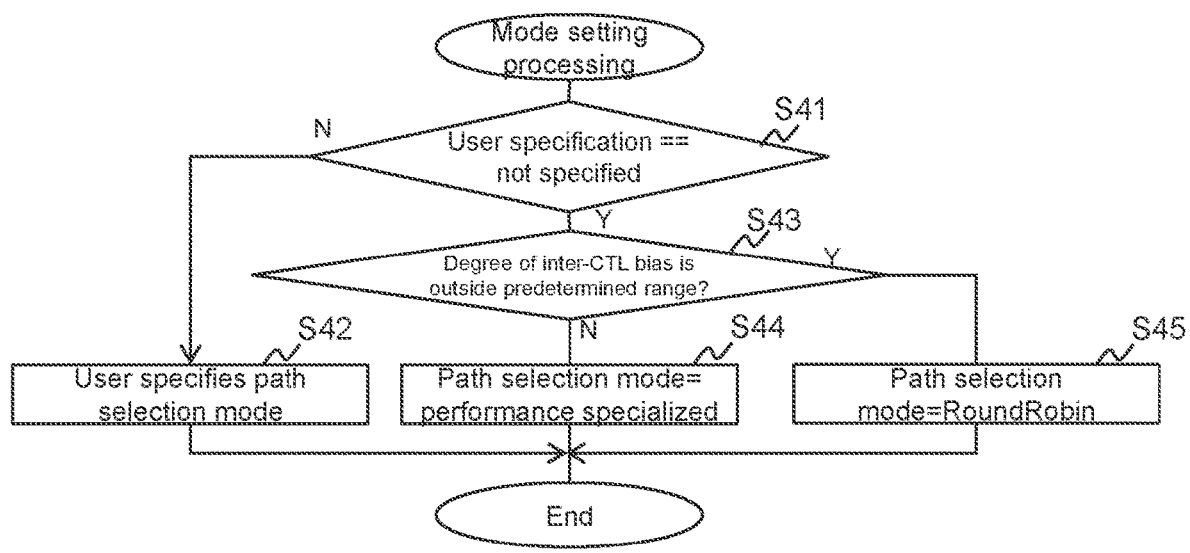
FIG. 10 is a flowchart of a mode configuration processing according to a modification of the first embodiment.

FIG. 10 is a flowchart of a mode configuration processing according to a modification of the first embodiment.

The mode configuration processing is executed by the MP 126 every predetermined time period (for example, every 10 second), for example. The mode configuration processing is executed for each record of the path selection management table 127.

The MP 126 determines whether the value of the user specification 127c of the processing target record of the path selection management table 127 is "not specified" (S41).

As a result, when the value of the user specification 127c is not "not specified" (S41: N), the MP 126 configures the value of the path selection mode 127d of the processing target record to the value of the user specification 127c (S42) and the processing on the processing target record ends.

On the other hand, when the value of the user specification 127c is "not specified" (S41: Y), the MP 126 determines whether the degree of inter-CTL bias acquired from the degree of inter-CTL bias 128e of the record corresponding to the same GAD_VOL of the bias management table 128 is outside the range configured in the performance specialized change threshold 127e of the processing target record of the path selection management table 127 (S43).

As a result, when the degree of inter-CTL bias is not outside the range configured in the performance specialized change threshold 127e of the processing target record (S43: N), since it means that the Write command is not biased to one CTL 120, the value of the path selection mode 127d of the processing target record is configured to "performance specialized" (S44) in order to reduce the processing load of CTL and the processing on the processing target record ends.

On the other hand, when the degree of inter-CTL bias is outside the range configured in the performance specialized change threshold 127e of the processing target record (S43: Y), since it means that the Write command is too biased to one CTL 120, the value of the path selection mode 127d of the processing target record is configured to "RoundRobin" (S45) in order to distribute the load between CTLs and the processing on the processing target record ends.

Next, a computer system according to a second embodiment will be described.

The computer system according to the second embodiment has a hardware configuration substantially similar to that of the computer system of the first embodiment and will be described appropriately with reference to FIGS. 1 and 2. In the computer system 1 according to the second embodiment, the roles of the storage systems 100 with respect to the host 10 are different. The storage system 100A serves as a primary storage system that can be accessed from the host 10 whereas the storage system 100B serves as a secondary storage system that cannot be normally accessed from the host 10 and that retains the same data as the primary storage system. The secondary storage system can be used by switching configurations when a fault occurs in the primary storage system, for example. Copying (so called True Copy) of data from the storage system 100A, which is a primary storage system, to the storage system 100B, which is a secondary storage system, is performed after duplication of write data to the CM 124 on the storage system 100A ends, for example. Below, a difference between the computer system according to the second embodiment and the computer system according to the first embodiment will be mainly described.

First, an operation of a write processing when a write request is received in the storage system 100 according to the second embodiment will be described.

Figure 11:
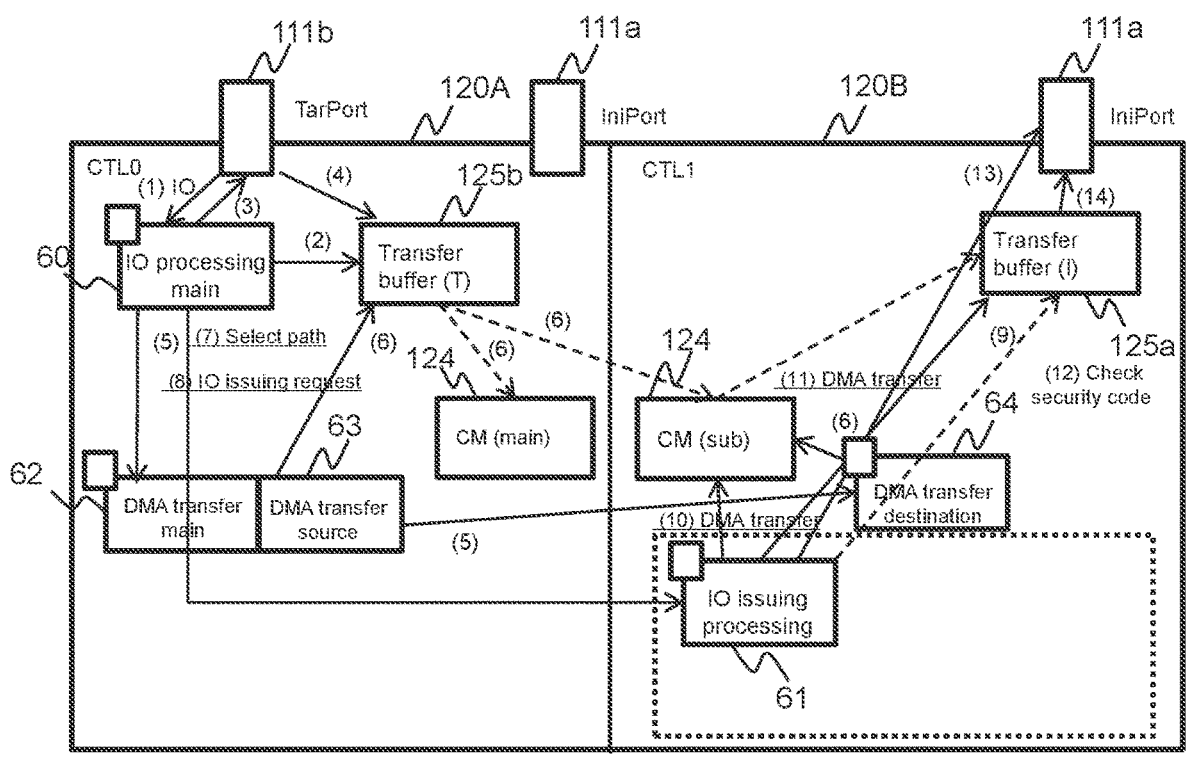
FIG. 11 is a diagram for describing an operation of a write processing when a write request is received according to a second embodiment.
Figure 12:
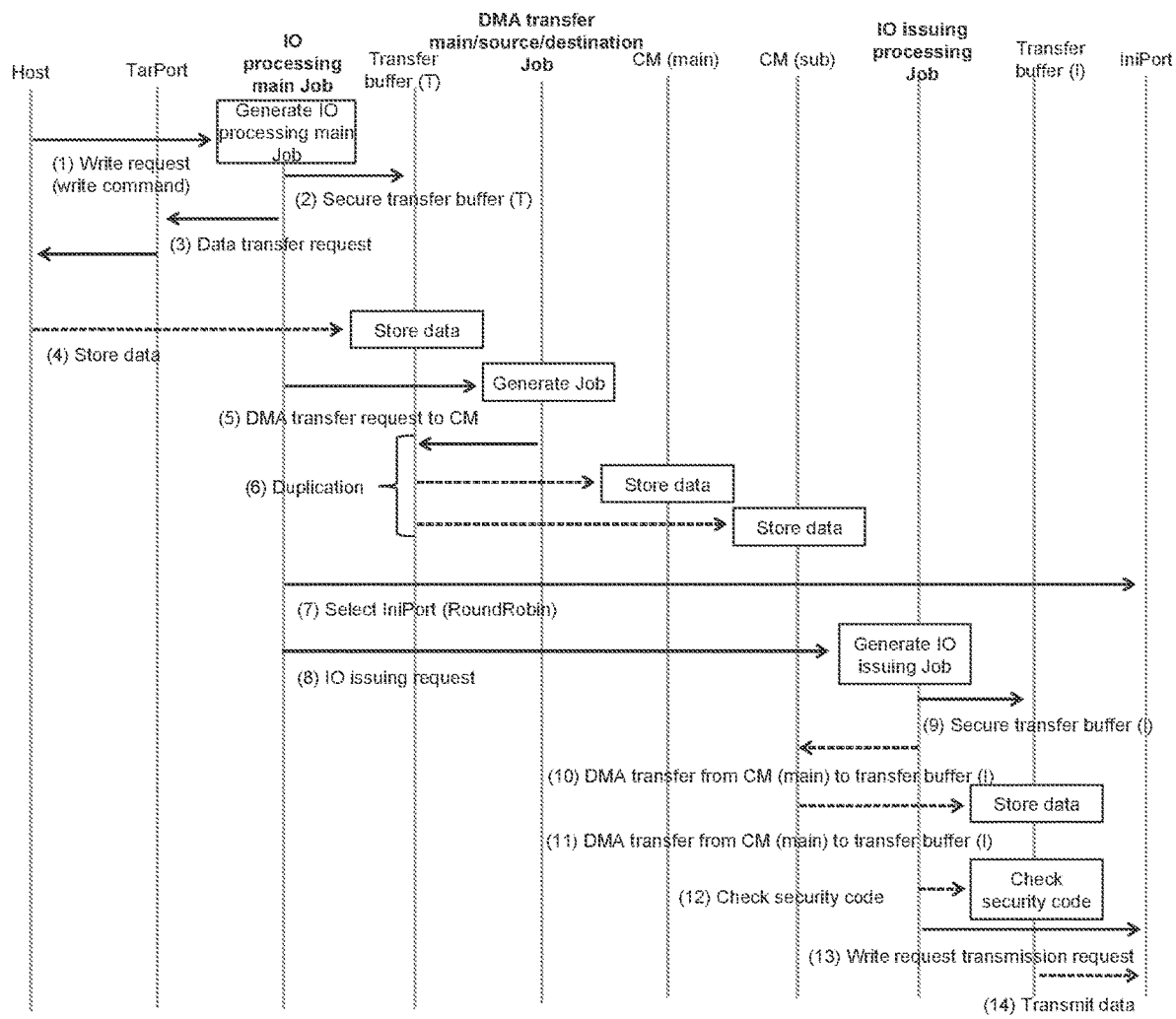
FIG. 12 is a sequence diagram of a write processing when a write request is received according to the second embodiment.

FIG. 11 is a diagram for describing an operation of a write processing when a write request is received according to the second embodiment. FIG. 12 is a sequence diagram of a write processing when a write request is received according to the second embodiment. In this example, a difference from the write processing operation when a write request is received according to the first embodiment illustrated in FIGS. 5 and 6 will be mainly described.

After the write data is duplicated and stored in the CM 124 (CM (main)) of CTL0 and the CM 124 (CM (sub)) of CTL1 by the MP 126 ((6) in FIGS. 11 and 12), the MP 126 executing the IO processing main Job 60 selects a port (an IniPort) for transmitting the write data to another storage system 100 ((7) in FIGS. 11 and 12). In the present embodiment, the MP 126 selects the IniPort according to the round robin method among all IniPorts in the storage system 100. In the following description, it is assumed that the IniPort 111a of the FEPK 110B coupled to CTL1 is selected.

Subsequently, the MP 126 executing the IO processing main Job 60 issues an IO issuing request to the MP 126 of CTL1 to generate a copy job (the IO issuing processing Job 61) for transmitting write data to another storage system ((8) in FIGS. 11 and 12).

The MP 126 executing the IO issuing processing Job 61 secures the transfer buffer 125a for storing write data to be transmitted by the selected IniPort 111a ((9) in FIGS. 11 and 12), reads the write data stored in the CM 124, and stores the write data in the transfer buffer 125a ((10) and (11) in FIGS. 11 and 12).

Subsequently, the MP 126 executing the IO issuing processing Job 61 examines whether the write data is stored appropriately by checking a security code of the write data stored in the transfer buffer 125a ((12) in FIGS. 11 and 12).

Subsequently, the MP 126 executing the IO issuing processing Job 61 issues a transmission request for a write request to the IniPort 111a ((13) in FIGS. 11 and 12).

In this way, a write request for writing write data is transmitted to the other storage system 100 in which a copy of the write data is to be stored via the IniPort 111a. After that, when a data transfer request is received from another storage system 100, the write data stored in the transfer buffer 125a is transmitted to the other storage system 100 via the IniPort 111a and is stored in the storage system 100 ((14) in FIGS. 11 and 12).

As described above, according to the storage system 100 of the present embodiment, write data is transmitted from the CM 124 of the CTL coupled to the IniPort selected to transmit write data to the other storage system 100 to the transfer buffer 125a of the CTL. Therefore, it is not necessary to transmit the write data from the transfer buffer of the other CTL to the transfer buffer of the CTL, and it is possible to reduce the load of the MP 126 of the CTL 120.

Next, a computer system according to a third embodiment will be described.

The computer system according to the third embodiment has a hardware configuration substantially similar to that of the computer system of the first embodiment and will be described appropriately with reference to FIGS. 1 and 2. In the computer system 1 according to the third embodiment, write data is extracted from the transfer buffer 125b in which the write data received by the TarPort 111b is stored so that the write data is transmitted to the other storage system 100 via the IniPort.

First, an operation of a write processing when a write request is received in the storage system 100 according to the third embodiment will be described.

Figure 13:
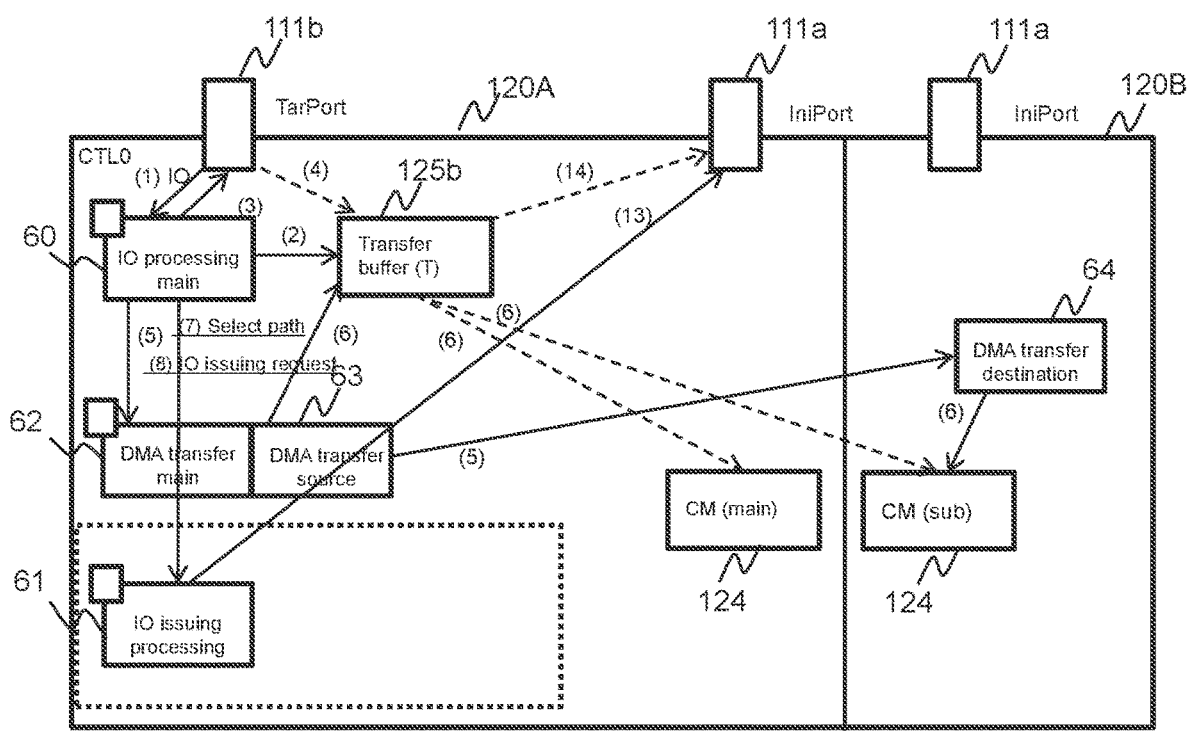
FIG. 13 is a diagram for describing an operation of a write processing when a write request is received according to a third embodiment.
Figure 14:
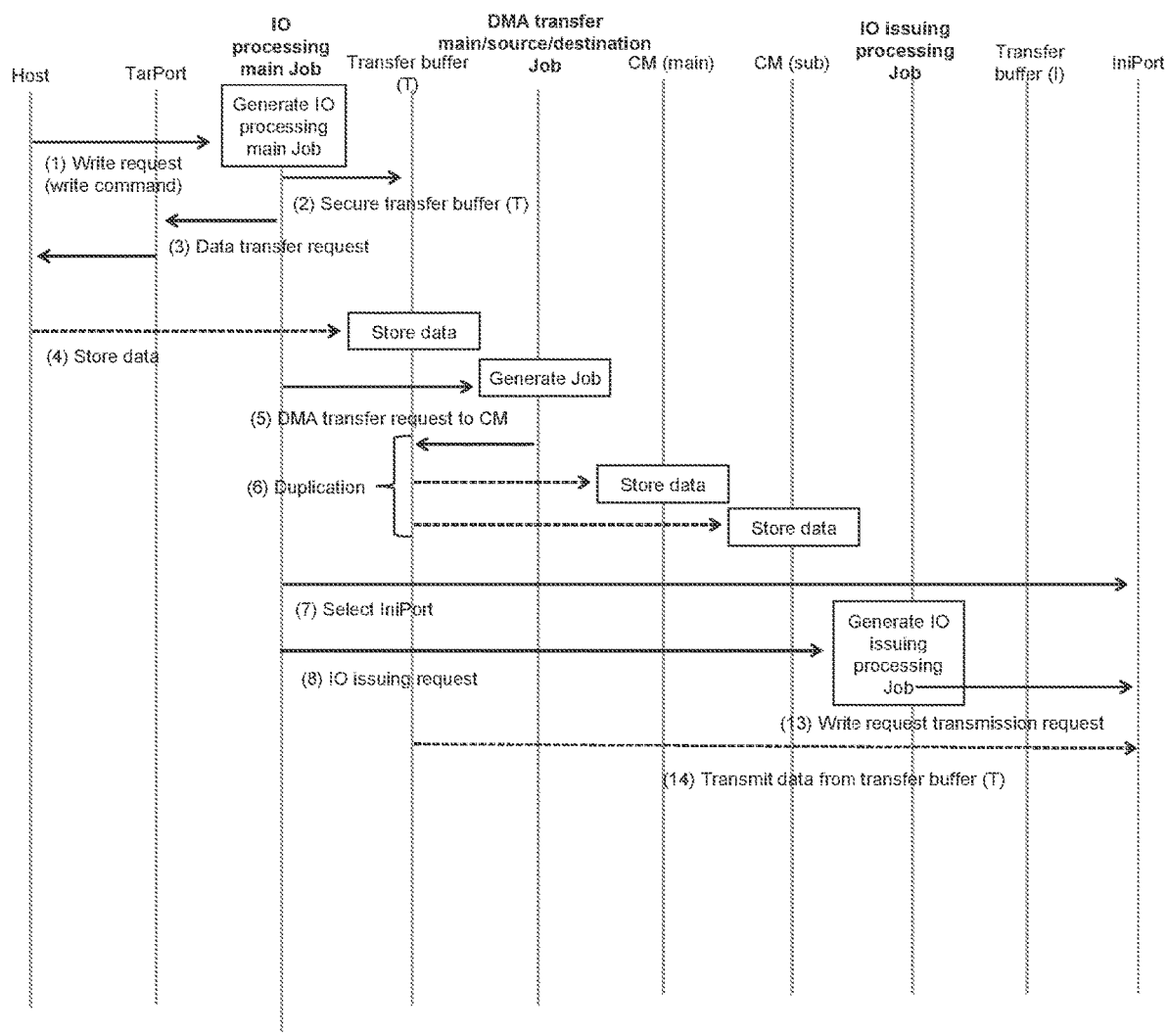
FIG. 14 is a sequence diagram of a write processing when a write request is received according to the third embodiment.

FIG. 13 is a diagram for describing an operation of a write processing when a write request is received according to the third embodiment. FIG. 14 is a sequence diagram of a write processing when a write request is received according to the third embodiment. In this example, a difference from the write processing operation when a write request is received according to the first embodiment illustrated in FIGS. 5 and 6 will be mainly described.

After the MP 126 executing the IO processing main Job 60 selects an IniPort for transmitting write data to the other storage system 100 ((7) in FIGS. 13 and 14), the MP 126 issues an IO issuing request and generates a copy job (an IO issuing process Job 61) for transmitting the write data to the other storage system 100 ((8) in FIGS. 13 and 14).

The MP 126 executing the IO issuing processing Job 61 issues a transmission request for a write request to the IniPort 111a ((13) in FIGS. 13 and 14). Here, the transmission request for the write request includes a request for extracting write data from the transfer buffer 125b and transmitting the write data.

In this way, a write request for writing write data is transmitted to the other storage system 100 that is to store a copy of the write data via the IniPort 111a. After that, when a data transfer request is received from the other storage system. 100, the write data stored in the transfer buffer 125b is transmitted to the other storage system 100 via the IniPort 111a and is stored in the storage system 100 ((14) in FIGS. 13 and 14).

As described above, according to the storage system 100 of the present embodiment, when the path selection mode is determined to be the performance specialized mode, write data is extracted from the transfer buffer in which the write data received via the TarPort is stored and the write data is transmitted. Therefore, it is not necessary to transmit the write data received and stored via the TarPort to the other transfer buffer, and it is possible to reduce the load of the MP 126 of the CTL 120.

Next, a computer system according to a fourth embodiment will be described.

The computer system according to the fourth embodiment has a hardware configuration substantially similar to that of the computer system of the first embodiment and will be described appropriately with reference to FIGS. 1 and 2. In the computer system 1 according to the fourth embodiment, the computer system 1 according to the second embodiment transmits the write data stored in the CM 124 to the other storage system 100 via the IniPort.

First, an operation of a write processing when a write request is received in the storage system 100 according to the fourth embodiment will be described.

Figure 15:
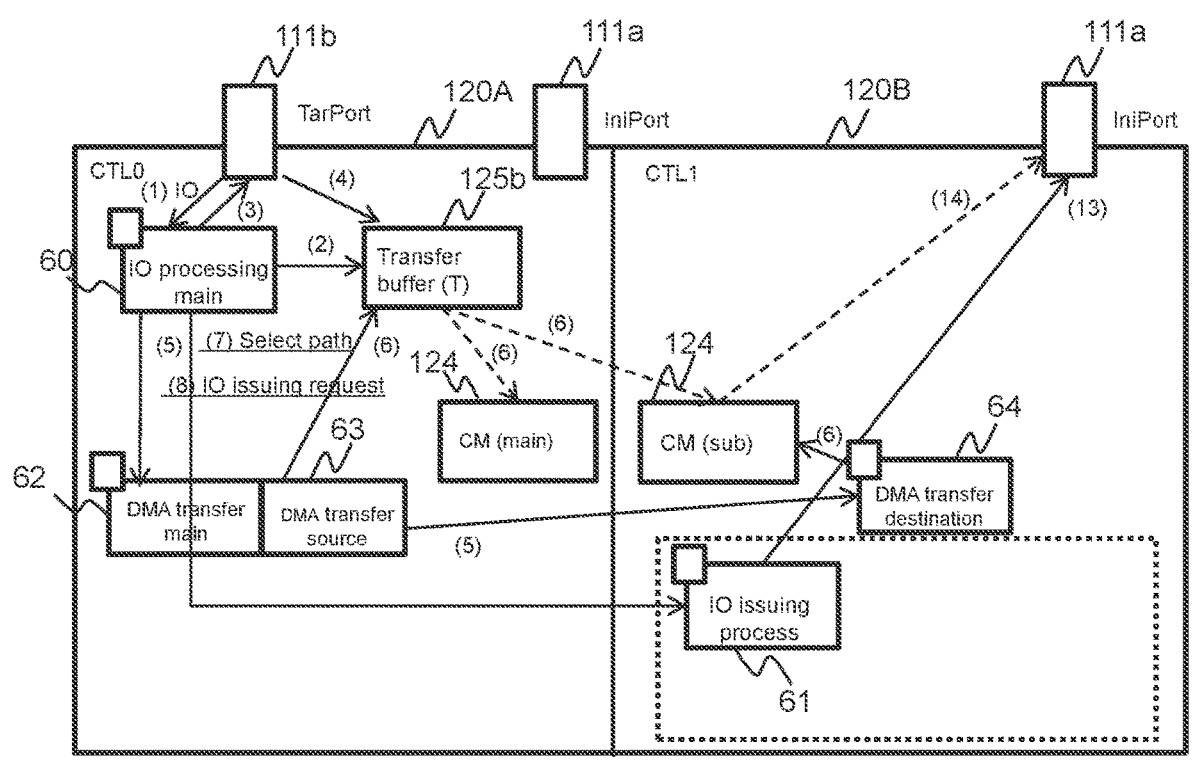
FIG. 15 is a diagram for describing an operation of a write processing when a write request is received according to a fourth embodiment.

FIG. 15 is a diagram for describing an operation of a write processing when a write request is received according to the fourth embodiment. In this example, a difference from the write processing operation when a write request is received according to the second embodiment illustrated in FIGS. 11 and 12 will be mainly described.

After the MP 126 executing the IO processing main Job 60 selects an IniPort for transmitting write data to the other storage system 100 ((7) in FIG. 15), the MP 126 issues an IO issuing request and generates a copy job (an IO issuing process Job 61) for transmitting the write data to the other storage system to the other CTL (CTL1) ((8) in FIG. 15).

The MP 126 of CTL1 executing the IO issuing processing Job 61 issues a transmission request for a write request to the IniPort 111*a* ((13) in FIG. 15). Here, the transmission request for the write request includes a request for extracting write data from the CM 124 in CTL1 and transmitting the write data.

In this way, a write request for writing write data is transmitted to the other storage system 100 that is to store a copy of write data via the IniPort 111*a*. After that, when a data transfer request is received from the other storage system 100, the write data stored in the CM 124 is transmitted to the other storage system 100 via the IniPort 111*a* and is stored in the storage system 100 ((14) in FIG. 15).

As described above, according to the storage system 100 of the present embodiment, write data is extracted from the CM 124 of the CTL 120 coupled to the IniPort selected to transmit write data to the other storage system 100 and is transmitted to the other storage system 100. Therefore, it is not necessary to transmit write data from the CM. 124 to the transfer buffer, and it is possible to reduce the load of the MP 126 of the CTL 120.

Next, a computer system according to a fifth embodiment will be described.

The computer system according to the fifth embodiment has a hardware configuration substantially similar to that of the computer system of the first embodiment and will be described appropriately with reference to FIGS. 1 and 2. In the computer system 1 according to the fifth embodiment, the IO processing main Job 65 of the computer system 1 according to the third embodiment includes an IO issuing processing Job 61 and an IO processing main Job 60.

First, an operation of a write processing when a write request is received in the storage system 100 according to the fifth embodiment will be described.

Figure 16:
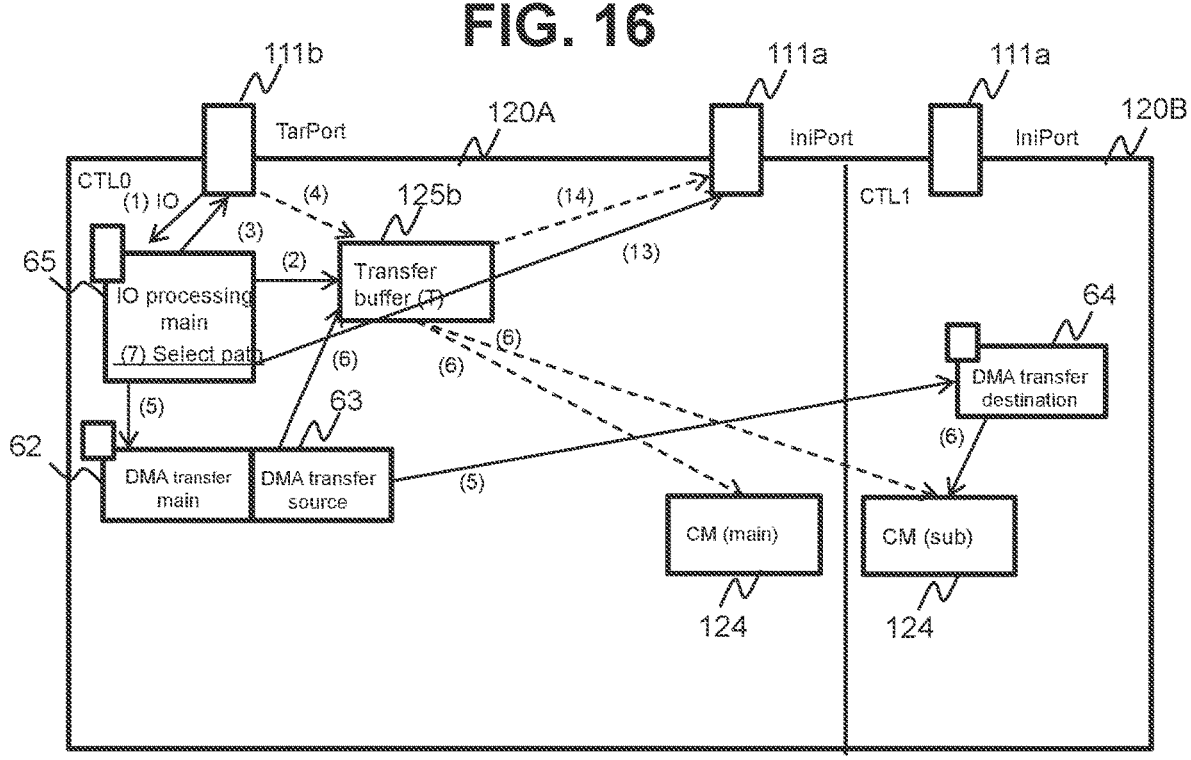
FIG. 16 is a diagram for describing an operation of a write processing when a write request is received according to a fifth embodiment.

FIG. 16 is a diagram for describing an operation of a write processing when a write request is received according to the fifth embodiment.

After the MP 126 executing the IO processing main Job 65 selects an IniPort for transmitting write data to the other storage system 100 ((7) in FIG. 16), the MP 126 issues a transmission request for a write request to the IniPort 111*a* ((13) in FIG. 16). Here, the transmission request for the write request includes a request for extracting write data from the transfer buffer 125*b* and transmitting the write data.

In this way, a write request for writing write data is transmitted to the other storage system 100 that is to store a copy of write data via the IniPort 111*a*. After that, when a data transfer request is received from the other storage system. 100, the write data stored in the transfer buffer 125*b* is transmitted to the other storage system 100 via the IniPort 111*a* and is stored in the storage system 100 ((14) in FIG. 16).

As described above, according to the storage system 100 of the present embodiment, the IO processing main Job 65 can execute a processing which has been executed by the IO issuing processing Job.

Next, a computer system according to a sixth embodiment will be described.

The computer system according to the sixth embodiment has a hardware configuration substantially similar to that of the computer system of the first embodiment and will be described appropriately with reference to FIGS. 1 and 2. In the computer system 1 according to the sixth embodiment, the IO processing main Job 65 of the computer system 1 according to the fourth embodiment includes an IO issuing processing Job 61 and an IO process main Job 60.

First, an operation of a write processing when a write request is received in the storage system 100 according to the sixth embodiment will be described.

Figure 17:
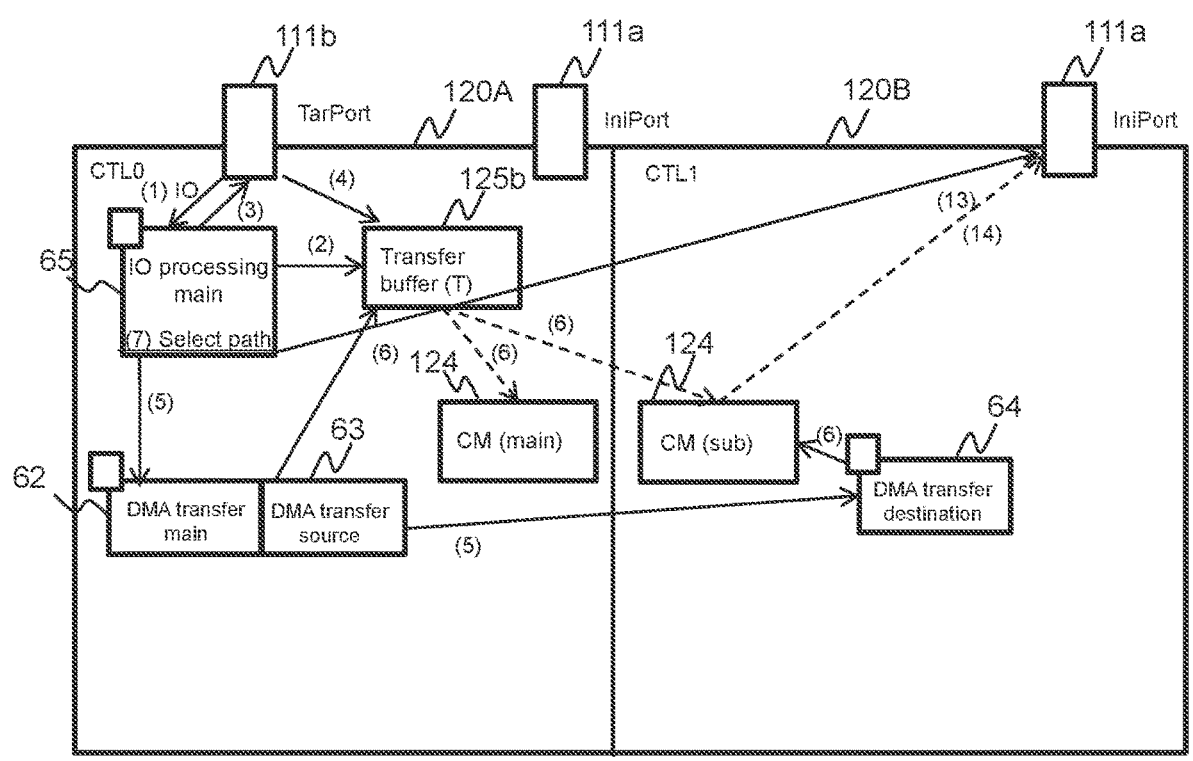
FIG. 17 is a diagram for describing an operation of a write processing when a write request is received according to a sixth embodiment.

FIG. 17 is a diagram for describing an operation of a write processing when a write request is received according to the sixth embodiment.

After the MP 126 executing the IO processing main Job 65 selects an IniPort for transmitting write data to the other storage system 100 ((7) in FIG. 17), the MP 126 issues a transmission request for a write request to the IniPort 111*a* ((13) in FIG. 17). Here, the transmission request for the write request includes a request for extracting write data from the CM 124 of CTL1 and transmitting the write data.

In this way, a write request for writing write data is transmitted to the other storage system 100 that is to store a copy of write data via the IniPort 111*a*. After that, when a data transfer request is received from the other storage system 100, the write data stored in the CM 124 is transmitted to the other storage system 100 via the IniPort 111*a* and is stored in the storage system 100 ((14) in FIG. 17).

As described above, according to the storage system 100 of the present embodiment, the IO processing main Job 65 can execute a processing which has been executed by the IO issuing processing Job.

The present invention is not limited to the above-described embodiments but can be changed appropriately without departing from the spirit of the present invention.

For example, in the above-described embodiments, although a user can specify a path selection mode for each volume, the present invention is not limited thereto, and a common path selection mode can be specified for all volumes.

Moreover, in the third embodiment, although write data is read from the transfer buffer 125*b* and is transmitted to the other storage system 100, the present invention is not limited thereto, and write data may be read from the CM 124 of the CTL 120 coupled to the IniPort 111*a*, for example, and may be transmitted to the other storage system 100. In this case, since it is not necessary to secure the transfer buffer 125a for the IniPort 111a and to transmit write data to the transfer buffer 125a, it is possible to reduce a processing load of the MP 126.

Moreover, in the above-described embodiments, the DMA transfer main Job and the DMA transfer source Job may be included in the IO processing main Job. Moreover, a configuration of Job that executes the processings of the respective embodiments is not limited to the embodiments, and an arbitrary Job configuration may be used as long as necessary processing can be executed.

REFERENCE SIGNS LIST

1 Computer system
10 Host
20 Management server
30 Network
100, 100A, 100B Storage system

The invention claimed is:

1. A storage system coupled to another storage system and a higher-level apparatus via a network to copy write data from the higher-level apparatus to the other storage system, comprising:
 a plurality of interface units each having a plurality of ports couplable to the network; and
 a plurality of controllers each being coupled to respectively correspond to each of the interface units,
 wherein each of the plurality of controllers includes a processor unit,
 wherein when a first processor unit, of the plurality of processor units included in a first controller, of the plurality of controllers, receives write data from the higher-level apparatus via a first port of a first interface unit, of the plurality of interface units, coupled to the first controller, the first processor unit is configured to select a second port for transmitting the write data to the other storage system among the ports of the first interface unit coupled to the first controller, and to transmit the write data to the other storage system via the second port,
 wherein the first processor unit is configured to store write data received via the first port in a first transfer buffer of the first controller, to store write data stored in the first transfer buffer in a second transfer buffer of the first controller, and to transmit the write data stored in the second transfer buffer to the other storage system via the second port.

2. The storage system according to claim 1, wherein the first controller includes a cache memory for caching the write data, and
 the first processor unit is configured to store the write data stored in the first transfer buffer in a cache memory of the first controller belongs and a cache memory of another controller.

3. The storage system according to claim 2, wherein the first processor unit is configured to transmit the write data stored in the cache memory of the first controller, to the other storage system via the second port.

4. The storage system according to claim 2, further comprising:
 a disk unit including one or more storage devices; and
 a disk interface unit configured to enable data communication between the controller and the disk unit, wherein
 the first processor unit is configured to store write data stored in the cache memory in the storage device of the disk unit with the aid of the disk interface unit.

5. The storage system according to claim 1, wherein when the first processor unit receives write data via the first port, the first processor unit is configured to determine whether the second port for transmitting the write data to the other storage system will be selected among the ports of the first interface unit coupled to the first controller, based on a degree of bias in the number of write requests input to the plurality of controllers.

6. The storage system according to claim 5, wherein when the degree of bias of the number of write requests input to the plurality of controllers is within a predetermined allowable range, the first processor unit is configured to select the second port for transmitting the write data to the other storage system among the ports of the first interface unit coupled to the first controller.

7. The storage system according to claim 6, wherein when the degree of bias of the number of write requests input to the plurality of controllers is not within the predetermined allowable range, the first processor unit is configured to select the second port for transmitting the write data to the other storage system according to a round robin method among the ports of the first interface unit coupled to the first controller.

8. The storage system according to claim 6, wherein the storage system stores one or more volumes,
 the first controller is configured to store allowable range information indicating the allowable range of the degree of bias in the number of write requests input to the plurality of controllers for each volume, and
 the first processor unit is configured to determine whether the degree of bias in the number of write requests input to the controllers is within the allowable range for each volume on the basis of the allowable range information correlated with a write target volume.

9. The storage system according to claim 1, wherein the storage system stores one or more volumes,
 when the first controller is configured to receive write data for each volume via a first port coupled to the first interface unit coupled to the first controller, the first controller is configured to store a user specification indicating whether the second port for transmitting the write data to the other storage system will be selected among the ports of the first interface unit coupled to the first controller to which the interface unit belongs, and
 the first processor unit is configured to select the second port for transmitting the write data to the other storage system on the basis of the user specification.

10. The storage system according to claim 1, wherein the storage system and the other storage system are virtualized so as to be one storage system for the higher-level apparatus.

11. A copy control method by a storage system coupled to another storage system and a higher-level apparatus via a network to copy write data from the higher-level apparatus to the other storage system, the storage system including:
 a plurality of interface units each having a plurality of ports couplable to the network; and
 a plurality of controllers each being coupled to respectively correspond to each of the interface units, the method comprising:
 when write data is received from the higher-level apparatus via a first port coupled to a first interface unit, among the plurality of interface units, coupled to a first controller, among the plurality of controllers, to which a storage system belongs, selecting a second port for transmitting the write data to the other storage system among the ports of the first interface unit coupled to the first controller to which the storage system belongs;
transmitting the write data to the other storage system via the second port; and
storing write data received via the first port in a first transfer buffer of the first controller, storing write data stored in the first transfer buffer in a second transfer buffer of the first controller, and transmitting the write data stored in the second transfer buffer to the other storage system via the second port.

12. A computer system including a host computer, a first storage system, and a second storage system, wherein
the first storage system includes:
a plurality of interface units each having a plurality of ports couplable to the network; and
a plurality of controllers each respectively corresponding to each of the interface units,
wherein each of the controllers includes a processor unit, and wherein when a first processor unit, of the plurality of processor units, receives write data from the higher-level apparatus via a first port of a first interface unit, among the plurality of interface units, coupled to a first controller, the first processor unit is configured to select a second port for transmitting the write data to the second storage system among the ports of the first interface unit coupled to the first controller, and to transmit the write data to the second storage system via the second port, wherein the first processor unit is configured to store write data received via the first port in a first transfer buffer of the first controller, to store write data stored in the first transfer buffer in a second transfer buffer of the first controller, and to transmit the write data stored in the second transfer buffer to the other storage system via the second port.

* * * * *